United States Patent [19]

Peck et al.

[11] Patent Number: 5,095,411
[45] Date of Patent: Mar. 10, 1992

[54] HEADLAMP ADJUSTMENT ASSEMBLY

[75] Inventors: John D. Peck, Benfleet; Stafford, Michael J., Lichfield, both of England

[73] Assignee: Ford Motor Company, Dearborn, Mich.

[21] Appl. No.: 621,210

[22] Filed: Dec. 3, 1990

[30] Foreign Application Priority Data
May 19, 1989 [GB] United Kingdom ............ 89-11526

[51] Int. Cl.⁵ ............................................... F21M 3/20
[52] U.S. Cl. ...................... 362/66; 362/286; 362/428
[58] Field of Search .................. 362/66, 72, 270, 287, 362/418, 419, 427, 428, 286; 403/114, 115, 348, 349

[56] References Cited

U.S. PATENT DOCUMENTS

| | | | |
|---|---|---|---|
| 3,968,975 | 7/1976 | Herbenar | 403/114 |
| 4,188,655 | 2/1980 | Tallon et al. | 362/80 |
| 4,271,456 | 6/1981 | Dick | 362/66 |
| 4,524,407 | 6/1985 | Igura | 362/66 |
| 4,578,740 | 3/1986 | Krizmanic | 362/66 |
| 4,689,725 | 8/1987 | Saijo et al. | 362/66 |
| 4,709,306 | 11/1987 | Harris et al. | 362/68 |
| 4,916,587 | 4/1990 | Hirose et al. | 362/66 |
| 4,959,758 | 9/1990 | Filosa et al. | 362/66 |

*Primary Examiner*—Ira S. Lazarus
*Assistant Examiner*—Richard R. Cole
*Attorney, Agent, or Firm*—Paul K. Godwin, Jr.; Clifford L. Sadler

[57] ABSTRACT

An adjustable headlight is described having a reflector 14 movably mounted within an outer casing 12 and an actuator 26 fitted to an opening in the outer casing 12 and having an output shaft 26 extending through the opening in the casing and connected to the reflector 14 to enable the reflector to be pivoted within the casing 12 to adjust the headlight beam, the output shaft 28 of the actuator 26 being connected to the reflector by means of a bayonet fitting 30, 32.

2 Claims, 1 Drawing Sheet

HEADLAMP ADJUSTMENT ASSEMBLY

BACKGROUND OF THE INVENTION

1. Field of the Invention

The present invention is concerned with the adjustment of the headlights of a motor vehicle and in particular with remote adjustment to permit the headlight setting to be varied to compensate for changes in the attitude of the vehicle brought about by carrying different loads.

2. Description of the Prior Art

It is known to provide for remote manual or motorized adjustment of the setting of the vehicle headlights and more recently headlights had been specifically constructed with this aim in mind. Instead of the reflector being rigidly mounted in the headlight casing in relation to the front lens, the reflector is mounted for movement about three pivot points to permit horizontal and vertical adjustment. This gives the advantage that the adjusters are all encased within the housing of the headlight and are protected from dirt and corrosion.

There is little, if any, need to provide for remote horizontal adjustment, that is to say for moving the beam from left to right. Vertical adjustment to raise or lower the beam has been carried out by an actuator, such as an electrical motor, which is fitted to an opening in the outer casing of the headlight and has an output shaft which passes through the opening and is suitably connected to one of the pivot points.

The connection previously adopted between the output shaft of the actuator and the reflector has been a ball-and-socket joint. While permitting the reflector to be pulled in and out for vertical adjustment, the coupling also acts as a pivot so that the headlight may rotate about a vertical axis for the purpose of horizontal adjustment.

A ball-and-socket joint recessed within a housing presents difficulty in assembly. If the ball is a tight fit in the socket, then the force needed to push the ball into the socket can damage the delicate reflector, whereas if the ball is loose in the socket, then it can be dislodged in use.

This problem of gripping the ball of a ball-and-socket joint can be avoided by the use of a collar on the socket which can be tightened after insertion of the ball; but in the present case one cannot readily tighten a collar about the ball-and-socket joint after assembly because access to it is no longer possible through the opening in the casing.

SUMMARY OF THE INVENTION

With a view to mitigating the foregoing disadvantages, there is provided in accordance with a first aspect of the present invention an adjustable headlight having a reflector movably mounted within an outer casing and an actuator fitted to an opening in the outer casing and having an output shaft extending through the opening in the casing and connected to the reflector to enable the reflector to be pivoted within the casing, the output shaft of the actuator being connected to the reflector by means of a bayonet fitting.

In a bayonet fitting, coupling is affected first by pushing, then by turning. The bayonet has radially projecting pins which first can slide in axial grooves in a bayonet socket. After being pushed along the axial grooves, the pins can engage in tangential grooves by rotation of the bayonet in the socket and thereafter the bayonet cannot be withdrawn axially. To assist in retention of the bayonet in the socket, the tangential grooves may be inclined or have a recess for retention of the bayonet pins.

Preferably, the bayonet is formed as a ball at the end of the output shaft of the actuator from which the bayonet pins project radially. In this way, pivoting about the bayonet fitting is enabled without the need for free play between the bayonet and its socket.

Advantageously, the body of the actuator is a bayonet fit in the outer casing framework of the headlight, the bayonets of the body and the output shaft being aligned so that by a single insertion and rotation the actuator is fitted to the headlight casing and its output shaft is coupled to the reflector.

According to a second aspect of the invention, there is provided an adjustable headlight having a reflector movably mounted within an outer casing. The outer casing has an opening for receiving an actuator from which an output shaft extends. In use, the output shaft extends through the opening in the casing and is connected to the reflector so as to enable the reflector to be pivotally adjusted with respect to the casing. The reflector includes a bayonet fitting for receiving a complementary fitting on the output shaft of the actuator.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
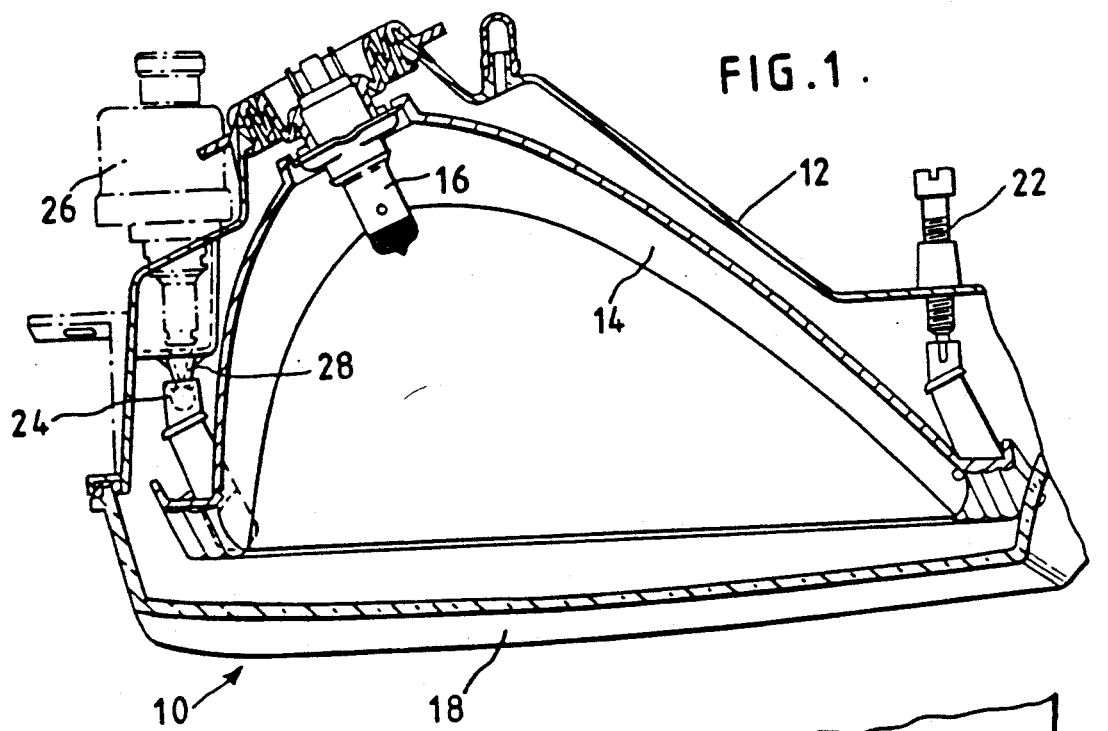
FIG. 1 is a partially sectioned view from above through a headlight having a reflector movably mounted within its outer casing.

The headlight 10 shown in FIG. 1 comprises an outer casing (framework) 12 and a movable reflector 14 supported at three pivot points relative to the outer casing to enable the headlight beam to be aimed correctly both in a vertical and in a horizontal sense. Light is emitted by a lamp 16 and after reflection by the reflector 14 passes through the front lens 18 of the headlight which is fixed relative to the casing. The casing 12 and the front lens are fixedly mounted relative to the vehicle body and the direction of the headlight beam is adjusted only by altering the position of one of more of the pivot points in the casing 12 on which the reflector is supported.

When viewed from the front of the headlight, the pivot points are arranged at the corners of a right angled triangle having a vertical side and a horizontal side. The pivot arranged at the right angle of this triangle is fixed and is not shown in FIG. 1. The other two pivots can be moved towards and away from the front lens in order to pivot the reflector.

The pivot point 20 at the end of the horizontal side of the triangle is adjustable and preset by means of a screw 22 to point the beam correctly from left to right on the road surface. The other pivot point 24 is connected to the output shaft 28 of an actuator 26 which permits the beam to be raised and lowered remotely.

The actuator 26 shown in the drawings is an electric motor having its output shaft 28 connected to the motor armature through a screw coupling. The output shaft 28 is prevented from rotating relative to the casing of the motor; and as the motor armature turns, the output shaft 28 slides in and out of the motor casing in linear directions. However, the invention is not restricted to the use of such an actuator, and one can replace the electric motor by a fluid operated actuator or even a mechanical cable-operated actuator.

Figure 2:
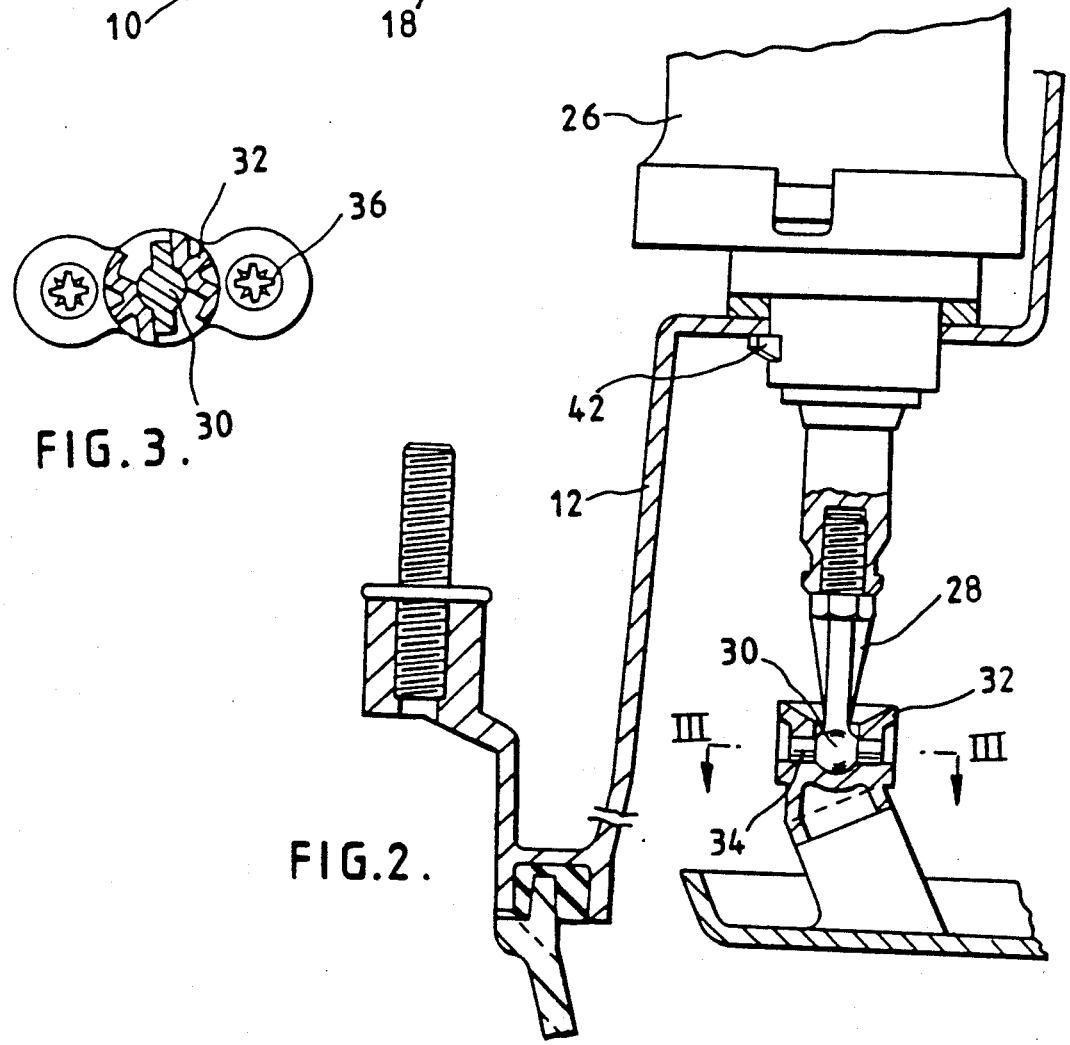
FIG. 2 is a detail showing the connection between the output shaft of the actuator and the movable reflector of the headlight.

Referring now to FIG. 2, the pivot point connection 24 between the reflector 14 and the actuator 26 is a ball/pin socket joint. A socket 32 is on the rear of the reflector 14 for accepting and retaining a bayonet 30 on the end of the output shaft 28 of the actuator 26. The bayonet 30 is formed by pins 34 projecting radially from a ball at the end of the shaft 28. The bayonet 30 is assembled to the socket 32 by first pushing the bayonet axially into the socket 32, then rotating the bayonet together with the body of the actuator 26 to enable the pins 34 to engage in recessed tangential grooves in the socket 32. Once the pins 34 are engaged in the grooves in the socket 32, axial linear movement of the output shaft 28 of the actuator 26 is transmitted to the pivot point 24 of the reflector 14 thereby tilting the reflector about the axis corresponding to the horizontal side of the triangle defined by the three pivot points.

Figure 3:
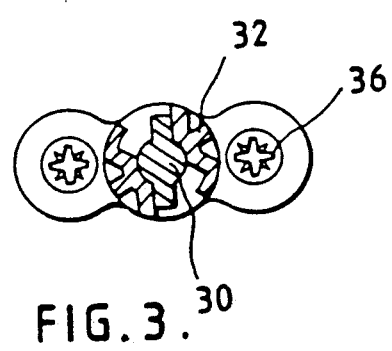
FIG. 3 is a section along the line III—III in FIG. 2.

The socket 32 is formed as part of a separate block which, as shown in FIG. 3, is secured to the reflector 14 by means of screws 36. The main alteration required on the headlight consists of screwing the block shown in FIG. 3 onto the reflector 14 in place of a conventional screw socket, prior to assembly of the reflector in the headlight casing 12.

The headlight casing 12 is also formed with an aperture in which the casing of the motor 26 is mounted. The casing of the motor has bayonet pins 42 which engage behind the lip of the aperture in the headlight casing 12 at the same time as the pins 34 of the bayonet 30 engage in the grooves of the socket 32. In this way, assembly of the actuator 26 to the headlight casing is greatly simplified and requires no more than inserting the motor output shaft 28 through the aperture in the headlight casing until its bayonet engages in the socket 32 and then turning the casing to effect simultaneous engagement between the output shaft 28 and the socket 30 on the one hand, and between the motor casing and the headlight casing on the other.

It should be clear that the socket of the bayonet fitting could be placed on the output shaft of the actuator and that the bayonet could be secured to the reflector. This and various other modifications may be made to the described headlight without departing from the scope of the invention as defined in the appended claims.

We claim:

1. An adjustable headlight having a reflector pivotally mounted within a relatively fixed outer casing and an actuator fitted to an opening in the outer casing; said actuator has an output shaft extending through the opening in the casing and connected to the reflector to enable the reflector to be pivoted within the casing, the output shaft of the actuator being connected to the reflector by means of a bayonet fitting, wherein the bayonet fitting is formed as a ball at the end of the output shaft of the actuator from which bayonet pins project radially, and wherein the body of the actuator contains a bayonet fitting that mates with the outer casing of the headlight, the bayonet fittings of the body and the output shaft being aligned so that by a single insertion and rotation the actuator is fitted to the outer casing and its output shaft is coupled to the reflector.

2. An adjustable headlight having a reflector pivotally mounted within a relatively fixed outer casing and an actuator having a body fitted to an opening in the outer casing; and actuator has an output shaft extending from its body and through the opening in the casing and connected to the reflector to enable the reflector to be pivoted within the casing, the output shaft of the actuator being connected to the reflector by means of a first bayonet fitting, said first bayonet fitting includes a ball having bayonet pins projecting radially therefrom and being located at the end of the output shaft of the actuator; and the body of said actuator contains a second bayonet fitting that mates with the outer casing of the headlight, wherein the bayonet fittings on the body and the output shaft being aligned so that by a single insertion and rotation the actuator is fitted to the outer casing and its output shaft is coupled to the reflector.

* * * * *